(12) United States Patent
Wissling

(10) Patent No.: US 10,508,675 B2
(45) Date of Patent: Dec. 17, 2019

(54) METHOD FOR ANCHORING AN EXPANSION ANCHOR IN A BOREHOLE

(71) Applicant: Hilti Aktiengesellschaft, Schaan (LI)

(72) Inventor: Matthias Wissling, St. Gallen (CH)

(73) Assignee: Hilti Aktiengesellschaft, Schaan (LI)

( * ) Notice: Subject to any disclaimer, the term of this patent is extended or adjusted under 35 U.S.C. 154(b) by 33 days.

(21) Appl. No.: 15/443,955

(22) Filed: Feb. 27, 2017

(65) Prior Publication Data

US 2017/0167517 A1 Jun. 15, 2017

Related U.S. Application Data

(62) Division of application No. 14/004,655, filed as application No. PCT/EP2012/052669 on Feb. 16, 2012, now abandoned.

(30) Foreign Application Priority Data

Mar. 23, 2011 (DE) .......................... 10 2011 005 999

(51) Int. Cl.
*F16B 13/06* (2006.01)
*E04B 1/41* (2006.01)

(52) U.S. Cl.
CPC .............. *F16B 13/065* (2013.01); *E04B 1/40* (2013.01); *F16B 13/063* (2013.01); *F16B 13/066* (2013.01)

(58) Field of Classification Search
CPC .... F16B 13/063; F16B 13/065; F16B 13/066; E04B 1/40; Y10T 29/49941
USPC .......................... 411/50, 51, 55, 60.1; 29/523
See application file for complete search history.

(56) References Cited

U.S. PATENT DOCUMENTS

| 1,560,095 | A |  | 11/1925 | Peirce |
|---|---|---|---|---|
| 2,955,504 | A | * | 10/1960 | Lovrinch ............. F16B 13/066 411/51 |
| 3,313,200 | A |  | 4/1967 | Fischer |

(Continued)

FOREIGN PATENT DOCUMENTS

| CN | 1198514 A | 11/1998 |
|---|---|---|
| DE | 36 01 597 A1 | 7/1987 |

(Continued)

OTHER PUBLICATIONS

Liebig, Heinrich; Fastening Anchor; Aug. 22, 2018; EPO English Machine Translation; pp. 1-5.*

(Continued)

*Primary Examiner* — Bayan Salone
(74) *Attorney, Agent, or Firm* — Crowell & Moring LLP

(57) ABSTRACT

A method for anchoring an expansion anchor in a borehole is disclosed. The expansion anchor includes an anchor bolt and an expansion body on a first terminal section of the anchor bolt, an actuator disposed on a second terminal section of the anchor bolt, and an expansion sleeve disposed around the anchor bolt. In an embodiment, the method includes hammering the expansion anchor into the borehole in an insertion direction and actuating the actuator to screw the expansion body outwardly in a direction that is opposite the insertion direction such that the expansion sleeve is expanded radially outwardly and digs into a wall of the borehole and such that the expansion body digs into the wall of the borehole.

10 Claims, 3 Drawing Sheets

(56) References Cited

U.S. PATENT DOCUMENTS

| | | | | |
|---|---|---|---|---|
| 3,523,482 | A | * | 8/1970 | Ploch .................... F16B 13/066 411/49 |
| 3,855,896 | A | * | 12/1974 | Kaufman .............. F16B 13/065 411/55 |
| 4,702,654 | A | * | 10/1987 | Frischmann .......... F16B 13/004 411/31 |
| 4,898,505 | A | | 2/1990 | Froehlich |
| 5,176,481 | A | * | 1/1993 | Schiefer ................ F16B 13/065 411/55 |
| 6,524,046 | B2 | * | 2/2003 | Hsu ....................... F16B 13/065 411/51 |
| 9,133,871 | B2 | * | 9/2015 | Schaeffer .............. F16B 13/065 |
| 2001/0010787 | A1 | * | 8/2001 | Hsu ....................... F16B 13/065 411/61 |
| 2007/0224015 | A1 | | 9/2007 | Ayrle |
| 2008/0050195 | A1 | * | 2/2008 | Wieser .................. F16B 13/065 411/44 |
| 2010/0111639 | A1 | | 5/2010 | Gaudron |

FOREIGN PATENT DOCUMENTS

| | | |
|---|---|---|
| DE | 41 16 149 A1 | 11/1992 |
| EP | 0 627 567 A1 | 12/1994 |
| EP | 0 724 085 A1 | 7/1996 |
| EP | 0724085 A1 * | 7/1996 ............ F16B 13/065 |
| EP | 1 243 801 A1 | 9/2002 |
| FR | 2 566 853 A1 | 1/1986 |
| GB | 2 151 739 A | 7/1985 |

OTHER PUBLICATIONS

International Search Report dated Apr. 27, 2012 (Three (3) pages).
U.S. Patent Application, "Anchor Bolt and Production Method", filed Sep. 11, 2013, Inventor Hideki Shimahara, et al.
Chinese Office Action dated Nov. 4, 2014 (Eight (8) pages).
English language machine translation of EP 0 724 085 A1 including Abstract, Specification, and Claims, available at http://worldwide.espacenet.com/publicationDetails/biblio?DB=worldwide.espacenet.com&II=0 . . . . .

* cited by examiner

METHOD FOR ANCHORING AN EXPANSION ANCHOR IN A BOREHOLE

This application is a divisional of U.S. application Ser. No. 14/004,655, filed Sep. 11, 2013, which was the National Stage of International Application No. PCT/EP2012/052669, filed Feb. 16, 2012, which claims the priority of German Patent Document No. 10 2011 005 999.7, filed Mar. 23, 2011, the disclosures of which are expressly incorporated by reference herein.

BACKGROUND AND SUMMARY OF THE INVENTION

This invention relates to an expansion anchor.

Expansion anchors with an anchor bolt, an expansion body, action means and an expansion sleeve surrounding the anchor bolt are used to fasten workpieces to a structural component. For this purpose, a boring is worked into the structural component which can be, for example, a concrete wall or a concrete ceiling, and then the anchor bolt is inserted into the boring. With the action means, the conical expansion body on the anchor bolt is moved so that the expansion body thereby presses the expansion sleeve radially outward resulting in an anchoring of the expansion bolt as a result of radial forces between the expansion sleeve or the expansion body and the structural component, such as the concrete that surrounds the boring. Workpieces or other items can thereby be fastened to the expansion anchor.

Between the expansion anchor and the wall of the borehole, a friction force between the wall of the borehole in the structural component and the expansion sleeve effects the anchoring of the expansion anchor. The conical expansion bodies are rotationally symmetrical to a longitudinal axis of the anchor bolt or of the expansion body.

German Patent Document No. DE 41 16 149 A1 describes an expansion anchor with anchor bolts, the cylindrical shank of which has an expanded portion in a terminal portion in the direction of installation, and on the end farther from this expanded portion has action means to bear the load, whereby the anchor bolt is surrounded at least along a portion of its shank by an expansion sleeve that can be displaced relative to the anchor bolt and has at least one longitudinal slot that is open toward the installation-side end and is provided with radial projections on its external contour.

The object of this invention is therefore to make available an expansion anchor in which a solid connection between the anchor sleeve and the concrete can be achieved with low manufacturing costs of the expansion anchor.

This object is accomplished with an expansion anchor that comprises an anchor bolt with an expansion body on a first terminal section of the anchor bolt with a longitudinal axis, at least one action means on another, second terminal section of the anchor bolt to bear the load, an expansion sleeve that surrounds the anchor bolt, whereby the expansion body, on the radially outer side, is at different distances from the longitudinal axis with reference to at least one identical point on the longitudinal axis in a transfer zone.

The expansion body of the anchor bolt therefore does not have a rotationally symmetrical geometry with reference to the longitudinal axis of the anchor bolt. Compared to a rotationally symmetric geometry, on one hand the invention teaches that the tendency of the cone to damage the borehole when it is hammered into the borehole is reduced, so that, according to the invention the energy required for installation and in particular the number of hammer blows required can be reduced. In addition, on account of the design of the conical shape of the invention, a co-rotation of the bolt during the application of the installation torque is reduced. During the spreading or radially outward deformation of the expansion sleeve with the expansion body, on the other hand, different deformations or expansions of the expansion sleeve occur in the tangential direction on the expansion body. As a result, the expansion sleeve or the expansion body can dig into the borehole wall or spread apart in a structural component with a very high compression force on the wall of the borehole in spot locations, as a result of which particularly large forces can thereby be absorbed by the expansion anchor. As a result of this geometry of the expansion body, manufacturing tolerances have only a very slight influence on the forces that can be transmitted to the wall of the borehole by the expansion anchor, so that reduced manufacturing precision in the manufacture of the expansion body is sufficient, which makes it possible to reduce manufacturing costs.

In particular, at least the transfer zone is corrugated or serrated, for example with at least 3, 4 or 7, preferably 7 to 9, corrugations or serrations and/or the distances between the at least one point and the longitudinal axis differ by at least 1%, 2%, 3%, 4%, 5%, 10%, 15% or 20%. The corrugations are preferably rounded by radii on their radial outside peaks. The serrations, on the other hand, can have angled edges.

In an additional configuration, the corrugated or serrated transfer zone occupies only a portion of the expansion body in the axial direction. Alternatively, the entire expansion body can be provided with corrugations or serrations.

The expansion body, in particular outside the transfer zone, has a conical geometry.

In an additional embodiment, the transfer zone has an essentially cylindrical shape and a longitudinal axis of the cylinder is oriented coaxially with the longitudinal axis of the anchor bolt. On account of the cylindrical transfer zone, the expansion body does not have a conical shape in the transfer zone. Therefore when the expansion sleeve with the expansion body is expanded, first of all the expansion sleeve on the conical expansion body expands radially outside the transfer zone and only in the vicinity of a first rear end of the anchor bolt does the transfer zone occur. At the beginning of the transfer zone, on account of the corrugated or serrated geometry of the transfer zone, as well as, in the transfer zone, different distances occur between the longitudinal axis and the transfer zone. Consequently, at the conclusion of the expansion process, the expansion anchor will be radially expanded to different degrees. The result can be a particularly effective anchoring of the expansion sleeve or of the expansion body in a borehole wall of a structural component such as a concrete wall or a concrete ceiling. Particularly high friction forces can therefore be transmitted on account of the high friction forces that occur in spot locations, and a positive or form-fitting anchoring of the expansion sleeve and/or of the expansion body in the borehole wall can be achieved.

Alternatively, the transfer zone can be essentially conical, whereby the apex angle of the transfer zone is preferably smaller than the apex angle of the expansion body outside the transfer zone. The expansion body preferably has two conical areas with different apex angles, whereby one of these areas contains the transfer zone with the corrugations or serrations.

Preferably, in a cross-section of the transfer zone, the points of the transfer zone which are at a maximum distance from the longitudinal axis are connected by a virtual circumscribed circle and the center of the circle corresponds to the longitudinal axis and/or in a cross-section of the transfer zone, the points of the transfer zone which are at a minimum distance to the longitudinal axis are connected with a virtual inscribed circle and the center of the inscribed circle corresponds to the longitudinal axis.

Conventional expansion bodies described in the prior art are rotationally symmetrical to the longitudinal axis. In one variant, the expansion body outside the transfer zone is conical or in the shape of a truncated cone and in the transfer zone the virtual inscribed circle and/or circumscribed circle has an essentially constant radius, i.e., the transfer zone is essentially cylindrical. The radius of the virtual circumscribed circle is greater than the maximum distance on the radial outside from the longitudinal axis of an expansion body described in the prior art. In one application of a rotationally symmetrical expansion body described in the prior art, the expansion sleeve, on account of the size or the geometry of the expansion sleeve, is associated with a specified expansion body and the maximum distance of this rotationally symmetrical expansion body known from the prior art is therefore smaller than the radius of the circumscribed circle. Consequently, during the expansion of the expansion body, when the expansion anchor claimed by the invention is used, it expands locally and radially to a greater extent at points that are at a maximum distance from the longitudinal axis than with the use of an expansion body described in the prior art. The radius of the inscribed circle is therefore less than or essentially equal to, i.e., with a variance of 10%, 5%, 3%, 2% or 1%, the maximum radius or the maximum distance from the longitudinal axis on the expansion body described in the prior art. In particular, the radius of the circumscribed circle can be different by at least 1% from the radius of the inscribed circle. As a result, with the use of an expansion body claimed by the invention, the expansion body is also expanded radially to a lesser extent or to an essentially equal extent at the points that are at a minimum distance from the longitudinal axis.

The radius of the virtual circumscribed circle advantageously varies by less than 20%, 10% or 5% and/or the radius of the virtual inscribed circle varies by less than 20%, 10% or 5%.

In an additional embodiment, the at least one action means comprises a thread on the anchor bolt, a shim or a baseplate with a boring and a nut.

In particular, the at least one action means is on a second terminal section of the anchor bolt.

In an additional embodiment, the anchor bolt and/or the expansion body and/or the at least one action means are made at least partly or completely of metal, such as steel, for example.

In an additional embodiment, the anchor bolt has a support ring and the expansion body is supported on the support ring. When the anchor bolt is unscrewed with the action means, e.g., the nut, an axial fastening of the expansion sleeve is necessary so that the expansion sleeve can expand. This expansion is accomplished by means of a frictional connection, e.g., because the expansion sleeve is additionally provided with projections.

In an additional variant of the invention, the expansion sleeve is guided up to a shim, i.e., it is in contact with an action means, and when the anchor bolt is unscrewed, the axial fixing of the expansion sleeve is not provided by friction between the borehole wall and the expansion sleeve but as a result of the fact that the expansion sleeve is in contact with at least one action means, e.g., a shim.

One exemplary embodiment of the invention is described in greater detail below with reference to the accompanying figures.

DETAILED DESCRIPTION OF THE DRAWINGS

Figure 1:
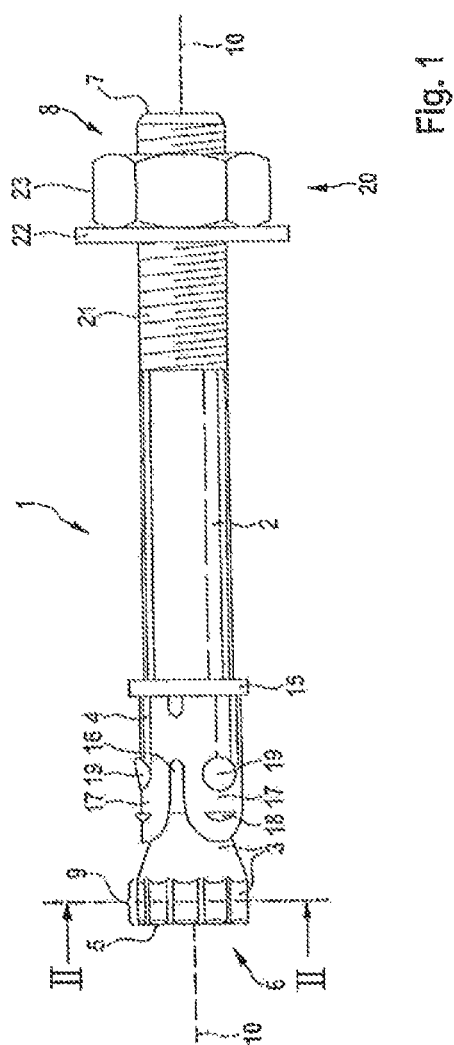
FIG. 1 is a side view of an expansion anchor.

An expansion anchor 1 illustrated in FIG. 1 is used to fasten workpieces to a structural component. A boring is machined into the structural component (not shown) and to fasten the workpiece the expansion anchor 1 is introduced or hammered into this boring. The structural component can be a concrete wall or the concrete ceiling of a building, for example.

The expansion anchor 1 comprises an anchor bolt 2. The anchor bolt 2 has a first end 5 with a first terminal section 6 and a second end 7 with a second terminal section 8. When the expansion anchor 1 is introduced into a wall borehole of the structural component, for example when it is hammered by means of a hammer, the first end 5 is inserted into the borehole and a second end 7 or a second terminal section 8 of the anchor bolt 2 remains outside the wall of the borehole. On the first terminal section 6 which is one piece with the anchor bolt 2, there is a conical expansion body 3. Between the expansion body 3 and a support ring 15 which is one piece with the anchor bolt 2, an expansion sleeve 4 is located coaxially around the anchor bolt 2. The expansion sleeve 4 is in contact with the support ring 15, so that when the expansion anchor 1 is hammered into the borehole wall and as a result of the resulting friction forces between the borehole wall and the expansion sleeve 4, the expansion sleeve 4 is not displaced on the anchor bolt 2 toward the second end 7 on account of its contact with the support ring 15.

The expansion sleeve 4 has a plurality, e.g., three or five, slots 16 that run in the direction of a longitudinal axis 10 of the anchor bolt 2 so that on account of the axial longitudinal slots 16, the expansion sleeve 4 has a plurality of expansion segments 17. On the expansion sleeve 4, in particular the expansion segments 17 are in the form of first projections 18 and second projections 19. The first projections 18 are closer to the first end 5 of the anchor bolt 2 than the second projections 19. The first and second projections 18, 19 also preferably have different geometries.

Located on the second terminal section 8 of the anchor bolt 2 are three action means 20. The action means 20 are a thread 21 machined into the anchor bolt 2, a shim 22 and a nut 23. The nut 23 has a female thread which is not shown and which is engaged in the male thread 21 on the anchor bolt 2.

Figure 2:
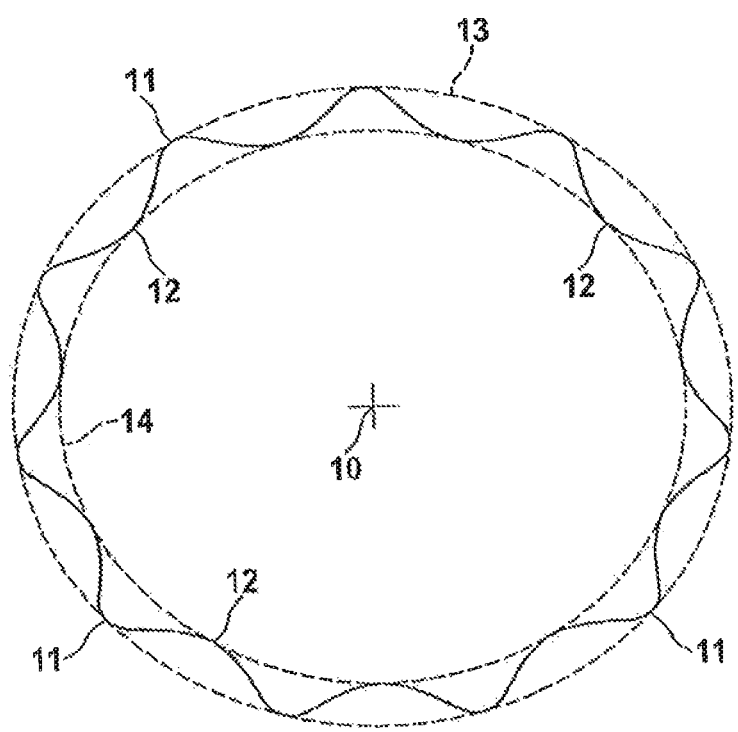
FIG. 2 is a cross-section II-II as illustrated in FIG. 1 of a transfer zone of the expansion anchor.

The expansion body 3 is provided on its radial outside with a transfer zone 9. The transfer zone 9 shown in a section 1141 in FIG. 1, i.e., a section perpendicular to the plane of the drawing in FIG. 1 and perpendicular to the longitudinal axis 10 of the anchor bolt 2, is corrugated with a plurality of corrugations. The expansion body 3, in the transfer zone 9, is therefore at different distances from the longitudinal axis 10. On the peaks of the corrugations in the transfer zone 9, points 11 therefore occur which are at a maximum distance from the longitudinal axis 10, and in the valleys of the corrugations, points 12 which are at a minimum distance from the longitudinal axis 10. The points 11 which are at a maximum distance are thereby connected to one another by a virtual circumscribed circle 13 which is shown in a broken line in FIG. 2, and the points 12 which are at a minimum distance from the longitudinal axis 10 are connected to one another on a virtual inscribed circle 14 which is shown in a broken line in FIG. 2. The expansion body 3 outside the transfer zone 9 is conical, i.e., a section along section II-II perpendicular to the plane of the drawing in FIG. 1 and perpendicular to the longitudinal axis 10 (not shown) therefore represents a circle with a radius that increases toward the first end 5. The transfer zone 9 is essentially cylindrical, i.e., preferably with a deviation of less than 20%, 10%, 5% or 2%, ignoring the corrugations or serrations, so that in a section along the section 1141 perpendicular to the plane of the drawing in FIG. 1 and perpendicular to the longitudinal axis 10 in the transfer zone 9, the virtual circumscribed and inscribed circles 13, 14 have a constant radius at different sections in the direction of the longitudinal axis 10.

To fasten workpieces to the expansion anchor 1, the expansion anchor 1 is introduced or hammered into a borehole or a boring in a structural component. After the insertion of the expansion anchor 1 into this borehole, the first end 5 is located inside the borehole and the second end 7 is located outside the borehole. By means of the action means 20, in which the nut 23 with the thread 21 is screwed, the anchor bolt 2 and thus also the expansion body 3 are screwed outward in the axial direction with reference to the longitudinal axis 10, so that on account of the axial fixing of the expansion sleeve 4 by the frictional forces between the expansion sleeve 4 in the borehole as well as on account of the projections 18, 19 which make possible a form-fitting connection, with the expansion body 3 the expansion sleeve 4 is expanded radially outward in the expansion segments 17 so that frictional forces and a bias force occur between the expansion sleeve 4 and/or the expansion body 3 and the borehole wall, to achieve an axial fixing of the expansion body 3 in the borehole wall for an axial fastening of the expansion anchor 1 in the borehole (not shown) of the structural component (not shown).

On account of the corrugated transfer zone 9 on the radial outside of the expansion body 3 in the vicinity of the first end 5, i.e., on the first terminal section 6 of the anchor bolt 2, a different radial bias or digging in of the expansion body 3 and/or of the expansion sleeve 4 into the borehole wall occurs. As a result, in the vicinity of the points 11 which are at the maximum distance from the longitudinal axis 10, significantly greater local bias forces occur than in the points 12 which are at the minimum distance from the longitudinal axis 10. In spot locations, there is a greater digging in as well as a form-fitting connection between the borehole wall and the expansion sleeve 4 and/or the expansion body 3. Even under difficult conditions, very large axial tensile forces can therefore be absorbed by the expansion anchor 1 because very great friction forces can be absorbed by the expansion sleeve 4 and/or the expansion body 3, and a very good form-fitting connection exists between the expansion sleeve 4 and/or the expansion body 3 as well as the borehole wall.

Figure 3:
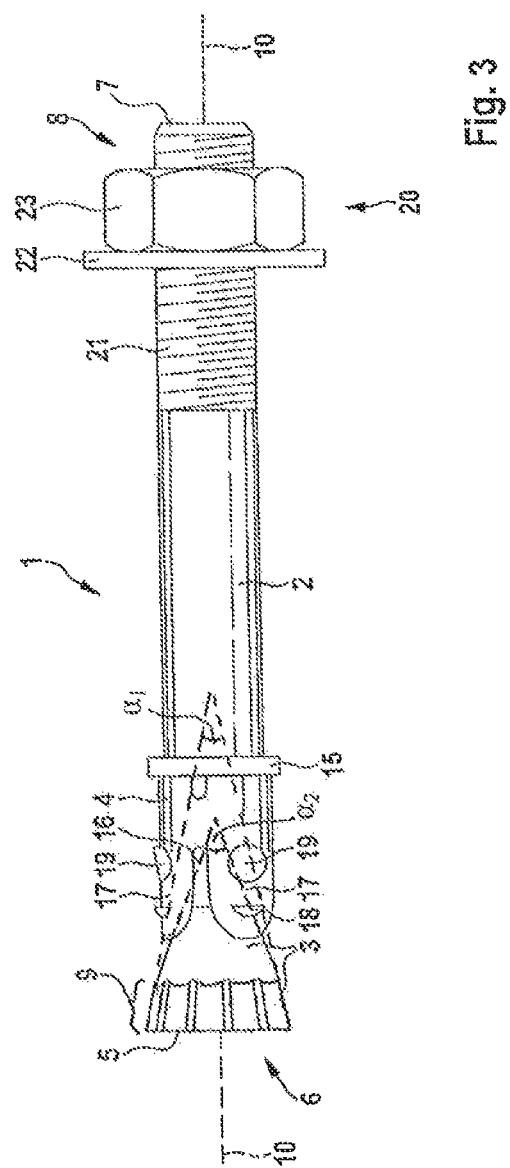
FIG. 3 is a side view of an additional expansion anchor.

An additional exemplary embodiment of an anchor is illustrated in FIG. 3. The example illustrated in FIG. 3 differs from the embodiment illustrated in FIG. 1 in that in FIG. 3, the transfer zone 9 with the corrugations or separations is conical, whereby the apex angle α1 in the transfer zone 9 is smaller than the apex angle α2 outside the transfer zone 9.

Overall, the expansion anchor 1 by the invention has significant advantages. On account of the corrugated geometry of the transfer zone 9 on the expansion body 3, tangentially a different bias or digging into the borehole wall is achieved in the peripheral direction of a circumscribed circle 13 or of an inscribed circle 14. In addition, the energy required to hammer in the anchor is significantly reduced and the anchor is protected to a greater extent against rotation inside the borehole. As a result, different factors that result from the manufacturing tolerances of the expansion body 3 have only a minor influence on the forces that can be transmitted by the expansion anchor 1, so that the expansion body 3 can be manufactured more economically with less-precise manufacturing and using alternative manufacturing methods.

What is claimed is:

1. A method for anchoring an expansion anchor in a borehole, wherein the expansion anchor includes:
    an anchor bolt with a longitudinal axis and an expansion body on a first terminal section of the anchor bolt;
    an actuator disposed on a second terminal section of the anchor bolt; and
    an expansion sleeve disposed around the anchor bolt;
    wherein the expansion body, on a radial outside in a transfer zone, has a plurality of first points that are located at a maximum distance from the longitudinal axis and a plurality of second points that are located at a minimum distance from the longitudinal axis such that the transfer zone is corrugated or serrated, wherein the transfer zone is conical;
    comprising the steps of:
    hammering the expansion anchor into the borehole in an insertion direction; and
    actuating the actuator to screw the expansion body outwardly in a direction that is opposite the insertion direction such that the expansion body expands the expansion sleeve radially outwardly and such that the corrugated or serrated transfer zone expands the expansion sleeve to result in the expansion sleeve being expanded to a first extent by the plurality of first points and being expanded to a second extent by the plurality of second points, wherein the first extent is greater than the second extent.

2. The method according to claim 1, wherein the maximum distance and the minimum distance differ by at least 1%.

3. The method according to claim 1, wherein the expansion body outside of the transfer zone has a conical geometry.

4. The method according to claim 1, wherein the plurality of first points are connected by a virtual circumscribed circle wherein a center of the circumscribed circle corresponds to the longitudinal axis, and wherein the plurality of second points are connected by a virtual inscribed circle wherein a center of the inscribed circle corresponds to the longitudinal axis.

5. The method according to claim 4, wherein a radius of the circumscribed circle differs by at least 1% from a radius of the inscribed circle.

6. The method according to claim 4, wherein the expansion body outside of the transfer zone is conical.

7. The method according to claim 1, wherein the actuator is comprised of a thread on the anchor bolt and a shim and a nut disposed on the thread.

8. The method according to claim 1, wherein the anchor bolt and/or the expansion body and/or the actuator are made at least partly of a metal.

9. The method according to claim 8, wherein the metal is steel.

10. The method according to claim 3, wherein an apex angle of the transfer zone is smaller than an apex angle of the expansion body outside of the transfer zone.

\* \* \* \* \*